Patented Aug. 27, 1946

2,406,605

UNITED STATES PATENT OFFICE 2,406,605

HYDROGENATION OF HALOGENOSILANES

Dallas T. Hurd, Schenectady, N. Y., assignor to General Electric Company, a corporation of New York No Drawing. Application March 15, 1945, Serial No. 582,998

15 Claims. (Cl. 260—607)

The present invention relates to the hydrogenation of halogenosilanes. It is particularly concerned with a method of substituting hydrogen atoms for at least some of the silicon-bonded halogen atoms in a highly halogenated chlorosilane to obtain the corresponding hydrogen compounds.

At the present time the most readily available silanes, for commercial use, are silicon tetrachloride and, in recent years, the hydrocarbon-substituted halogenosilanes, such as the methylchlorosilanes, in which all of the silicon bonds are connected either to hydrocarbon radicals or halogen atoms. Due to the increased commercial interest in silicon chemistry resulting from the introduction of polysiloxane resins, fluids, etc., there has been an increased demand for commercial quantities of other less readily available silanes and silane derivatives such as those in which all or part of the silicon-bonds are connected to hydrogen. The present invention has as its principal object the preparation of silane derivatives containing Si-bonded hydrogen from the more highly halogenated silanes, particularly from halogenosilanes containing at least three Si-bonded chlorine or bromine atoms. A more specific object of the present invention is to provide a method whereby one or more of the halogen atoms of a halogenosilane can be replaced by hydrogen to form the corresponding hydrogen compounds.

Briefly described, these and other objects which will appear hereinafter are attained in accordance with the present invention by bringing a gaseous mixture of a highly halogenated silane and hydrogen or a hydrogen halide, particularly the chloride or bromide, into contact at an elevated temperature with a metal selected from the group consisting of aluminum, magnesium and zinc. Examples of suitable halogenosilanes are silicon tetrachloride, silicon tetrabromide, the trichloro- and tribromo-silanes, the methyl trichloro- and tribromo-silanes, etc. The silane products generally comprise a mixture of some of the starting material, the less halogenated silanes such as the mono-, di- and tri-halogenated silanes and, in some cases, the completely hydrogenated materials such as silane, $SiH_4$. The metal is converted to its halide during the reaction, probably through the intermediate formation of a hydride which reacts with the halogenosilane or possibly by the direct reduction of silicon-halogen bonds under the conditions of the reaction leaving free silicon bonds for the formation of Si-H bonds.

In order that those skilled in the art better may understand how the present invention can be carried into effect the following illustrative examples are given:

Example 1

The vapor of silicon tetrachloride together with hydrogen gas in a mol ratio of 1:1 was passed over 20 mesh aluminum granules at 400° and the effluent products condensed by means of a Dry-Ice condenser. A portion of the condensate was hydrolyzed in water and the hydrolysis product treated with dilute sodium hydroxide solution. There was vigorous gas evolution showing the presence of substantial amounts of Si-bonded hydrogen. A distillation of the liquid condensate revealed the presence of about 3–5% of dichlorosilane, $SiH_2Cl_2$, and 25% of trichlorosilane, $SiHCl_3$, the remainder being largely unreacted silicon tetrachloride. Any silane, $SiH_4$, formed during the reaction was of course too volatile to be condensed at the temperature of dry ice.

Example 2

The vapor of methyltrichlorosilane (density= 1.27) together with hydrogen gas in 1:1 mol ratio was passed over a 4–1 mixture of 20 mesh aluminum granules and 200 mesh copper powder at a temperature of 450° C. Subsequent experiments indicated that the copper may be omitted and that its presence has no obvious effect on the course of the reaction. The product condensed by a water-cooled condenser had a density of 1.21. A portion of this product was hydrolyzed and the presence of Si-bonded hydrogen in the resulting gel was qualitatively shown by the vigorous gas evolution when the hydrolyzate was treated with dilute alkali. Distillation of the reaction product revealed the presence of approximately 5% of methyl dichlorosilane, $CH_3HSiCl_2$.

Example 3

A mixture of silicon tetrachloride vapor and hydrogen gas in 1:2 mol ratio was passed over granular zinc at 350–400°. A liquid product was condensed from the effluent gas mixture by means of a Dry-Ice condenser. A portion of the condensate was hydrolyzed in water to give a gel which upon treatment with alkali solution produced a vigorous evolution of gas. A distillation of the product revealed the presence of volatile compounds boiling below the boiling point of silicon tetrachloride. When these low boiling compounds were treated with dilute alkali the gas evolution was much more vigorous than in the case of the gel.

Similar results were obtained when granular magnesium was substituted for the zinc employed in Example 3.

*Example 4*

Methyltrichlorosilane in vapor form (density= 1.27) together with hydrogen chloride gas was passed in 2:1 ratio over aluminum granules at 350°. A liquid product of density 1.25 was condensed from the reaction products by means of a Dry-Ice condenser. Hydrolysis of a portion of this product gave a gel which upon treatment with alkali solution reacted with a vigorous evolution of gas. Distillation of the product revealed the presence of compounds more volatile than methyltrichlorosilane, which compounds were found to contain larger amounts of Si-bonded hydrogen than the gel.

*Example 5*

A mixture of vapors of silico-chloroform, $SiHCl_3$, and hydrogen gas in 1:3 ratio was passed over aluminum granules at 350°. A reaction ensued with the formation of aluminum chloride. Liquid product was collected in a series of condensers consisting of a Dry-Ice condenser followed by a liquid-air condenser. Distillation of the combined condensates yielded about 1–2% of monosilane, $SiH_4$; 1–2% of monochlorosilane, $SiH_3Cl$; and 10–15% of dichlorosilane, $SiH_2Cl_2$, the remainder being largely unreacted silico-chloroform.

It will be understood, of course, that the invention is not limited to the specific reactants, proportions and reaction conditions set forth in the above examples. The bromosilanes, such as silicon tetrabromide, tribromosilane, methyltribromosilane can be reacted with hydrogen or a hydrogen bromide or chloride in the presence of one or more of the designated metals in the same manner as the chlorosilanes to form corresponding products in which some of the Si-bonded bromine atoms have been replaced by hydrogen.

Although the invention is not limited to any particular reaction temperatures, best results appear to be obtained at temperatures ranging between 300 and 500° C., the preferred temperature depending to some extent on the particular combination of reactants employed. As the substitution of hydrogen for Si-bonded halogen is not quantitative, the mol ratio of hydrogen or hydrogen halide to halogenosilane should equal and preferably exceed that calculated as necessary to form the desired product. The unreacted starting materials can, of course, be recirculated to increase the overall yields of the desired products. When the metal is in a granular state, or in the form of shavings and the like, better control of the reaction can usually be obtained than when the metal is in a finely divided state.

What I claim as new and desire to secure by Letters Patent of the United States is:

1. The method which comprises contacting a mixture of (1) a halogenated silane having Si-bonded halogen atoms which are replaceable by hydrogen and (2) a material selected from the class consisting of hydrogen and hydrogen halides, in the vapor state and at an elevated temperature, with a metal selected from the class consisting of aluminum, magnesium and zinc, thereby to replace at least some of the halogen atoms of the said halogenated silane with hydrogen.

2. The method of substituting hydrogen for at least some of the halogen atoms in a halogenated silane containing at least three Si-bonded halogen atoms which comprises contacting a mixture of the vapors of said halogenated silane and a material selected from the class consisting of hydrogen and hydrogen halides at an elevated temperature with a metal selected from the class consisting of aluminum, magnesium and zinc.

3. The method of substituting hydrogen for at least some of the chlorine atoms in a chlorinated silane containing at least three Si-bonded chlorine atoms which comprises bringing a mixture of the vapors of said chlorinated silane and a material selected from the class consisting of hydrogen and hydrogen chloride into contact with aluminum at an elevated temperature.

4. The method of substituting hydrogen for at least some of the chlorine atoms in a chlorinated silane containing at least three Si-bonded chlorine atoms which comprises contacting a mixture of the vapors of said chlorinated silane and a material selected from the class consisting of hydrogen and hydrogen chloride at an elevated temperature with a metal selected from the class consisting of aluminum, magnesium and zinc.

5. The method of substituting hydrogen for at least some of the chlorine atoms in a chlorinated silane containing at least three Si-bonded chlorine atoms which comprises bringing a mixture of the vapors of said chlorinated silane and a material selected from the class consisting of hydrogen and hydrogen chloride into contact with zinc at an elevated temperature.

6. The method of substituting hydrogen for at least some of the halogen atoms in a silicon tetrahalide which comprises contacting a mixture of the vapors of said silicon tetrahalide and a material selected from the class consisting of hydrogen and hydrogen halides at an elevated temperature with a metal selected from the class consisting of aluminum, magnesium and zinc.

7. The method of substituting hydrogen for at least some of the chlorine atoms in silicon tetrachloride which comprises contacting a mixture of the vapors of silicon tetrachloride and a material selected from the class consisting of hydrogen and hydrogen chloride at an elevated temperature with a metal selected from the class consisting of aluminum, magnesium and zinc.

8. The method of substituting hydrogen for at least some of the chlorine atoms in a chlorinated silane containing at least three Si-bonded chlorine atoms which comprises contacting a mixture of the vapors of said chlorinated silane and a material selected from the class consisting of hydrogen and hydrogen chloride with aluminum at an elevated temperature of from 300 to 500° C.

9. The method of substituting hydrogen for at least some of the halogen atoms in a methyltrihalogenosilane which comprises contacting a mixture of the vapors of said trihalogenosilane and a material selected from the class consisting of hydrogen and hydrogen halides at an elevated temperature with a metal selected from the class consisting of aluminum, magnesium and zinc.

10. The method of substituting hydrogen for at least some of the chlorine atoms in a trichlorosilane which comprises contacting a mixture of the vapors of said trichlorosilane and a material selected from the class consisting of hydrogen and hydrogen chloride at an elevated temperature with a metal selected from the class consisting of aluminum, magnesium and zinc.

11. The method of substituting hydrogen for at least some of the chlorine atoms in silicon tetrachloride which comprises contacting a mixture of hydrogen and the vapors of silicon tetrachloride in a mol ratio of at least 1:1 with granular aluminum at a temperature of from 300 to 500° C.

12. The method of substituting hydrogen for at least some of the chlorine atoms in silicon tetrachloride which comprises contacting a mixture of hydrogen and the vapors of silicon tetrachloride in a mol ratio of at least 1:1 with granular zinc at a temperature of from 300 to 500° C.

13. The method of substituting hydrogen for at least some of the chlorine atoms in methyltrichlorosilane which comprises contacting a mixture of hydrogen and the vapors of methyltrichlorosilane in a mol ratio of at least 1:1 with granular aluminum at a temperature of from 300 to 500° C.

14. The method which comprises bringing into contact at an elevated temperature (1) a vaporous mixture of hydrogen and a chlorinated silane having Si-bonded chlorine atoms which are replaceable by hydrogen and (2) a metal selected from the class consisting of aluminum, magnesium and zinc thereby to replace at least some of the chlorine atoms of the said chlorinated silane with hydrogen.

15. The method which comprises bringing into contact at an elevated temperature (1) a vaporous mixture of hydrogen chloride and a chlorinated silane having Si-bonded chlorine atoms which are replaceable by hydrogen and (2) a metal selected from the class consisting of aluminum, magnesium and zinc thereby to replace at least some of the chlorine atoms of the said chlorinated silane with hydrogen.

DALLAS T. HURD.